United States Patent
Nicaise et al.

(10) Patent No.: US 11,292,059 B2
(45) Date of Patent: Apr. 5, 2022

(54) ADDITIVE MANUFACTURING PROCESS COMPRISING A POWDER DISTRIBUTION STEP PERFORMED BY AN INJECTOR

(71) Applicant: AddUp, Cebazat (FR)

(72) Inventors: Jean-Pierre Nicaise, Cebazat (FR); Jean-François Sartori, Cebazat (FR)

(73) Assignee: ADDUP, Cebazat (FR)

( * ) Notice: Subject to any disclaimer, the term of this patent is extended or adjusted under 35 U.S.C. 154(b) by 581 days.

(21) Appl. No.: 16/065,692

(22) PCT Filed: Dec. 20, 2016

(86) PCT No.: PCT/EP2016/082038
§ 371 (c)(1),
(2) Date: Jun. 22, 2018

(87) PCT Pub. No.: WO2017/108867
PCT Pub. Date: Jun. 29, 2017

(65) Prior Publication Data
US 2020/0269510 A1    Aug. 27, 2020

(30) Foreign Application Priority Data
Dec. 23, 2015    (FR) ...................................... 1563249

(51) Int. Cl.
*B29C 64/393*    (2017.01)
*B22F 10/20*    (2021.01)
(Continued)

(52) U.S. Cl.
CPC .............. *B22F 10/20* (2021.01); *B23K 26/34* (2013.01); *B23K 26/354* (2015.10);
(Continued)

(58) Field of Classification Search
None
See application file for complete search history.

(56) References Cited

U.S. PATENT DOCUMENTS

| | | |
|---|---|---|
| 5,252,264 A | 10/1993 | Forderhase et al. |
| 5,597,589 A | 1/1997 | Deckard |

(Continued)

FOREIGN PATENT DOCUMENTS

| | | |
|---|---|---|
| JP | 2007-216595 A | 8/2007 |
| JP | 2009-279928 A | 12/2009 |

(Continued)

OTHER PUBLICATIONS

International Search Report dated Mar. 8, 2017, issued in PCT/EP2016/082038.

(Continued)

*Primary Examiner* — Matthew J Daniels
*Assistant Examiner* — Mohammad M Ameen
(74) *Attorney, Agent, or Firm* — Venable LLP

(57) ABSTRACT

A process for the additive manufacture of a part within a machine, the machine including a working surface, a device for spreading the powder layer along at least one longitudinal horizontal direction, at least one injector of powder over the working surface, the injector being movable with respect to the working surface along at least one transverse horizontal direction, and a system for regulating the amount of powder dispensed by the injector, the process including the following stages: moving the injector along a trajectory comprising at least one component parallel to the transverse horizontal direction; and regulating the amount of powder dispensed by the injector at any point of the trajectory of the injector.

9 Claims, 7 Drawing Sheets

(51) Int. Cl.
*B29C 64/205* (2017.01)
*B29C 64/209* (2017.01)
*B29C 64/141* (2017.01)
*B29C 64/35* (2017.01)
*B33Y 10/00* (2015.01)
*B33Y 30/00* (2015.01)
*B33Y 50/02* (2015.01)
*B23K 26/354* (2014.01)
*B29C 64/153* (2017.01)
*B23K 26/34* (2014.01)

(52) U.S. Cl.
CPC .......... *B29C 64/141* (2017.08); *B29C 64/153* (2017.08); *B29C 64/205* (2017.08); *B29C 64/209* (2017.08); *B29C 64/35* (2017.08); *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 8,550,802 B2 | 10/2013 | Fuwa et al. |
| 9,403,235 B2 * | 8/2016 | Buller ................. B22F 3/24 |
| 10,569,363 B2 | 2/2020 | El-Dasher et al. |
| 2005/0280185 A1 * | 12/2005 | Russell ................. B28B 7/465 |
| | | 264/308 |
| 2010/0042241 A1 | 2/2010 | Inoue |
| 2011/0109016 A1 | 5/2011 | Fuwa et al. |
| 2011/0223349 A1 | 9/2011 | Scott |
| 2014/0252687 A1 * | 9/2014 | El-Dasher ......... B23K 26/0622 |
| | | 264/497 |
| 2014/0363585 A1 | 12/2014 | Pialot et al. |
| 2016/0129503 A1 | 5/2016 | El-Dasher et al. |
| 2016/0243652 A1 | 8/2016 | El-Dasher et al. |
| 2018/0229307 A1 | 8/2018 | Pialot et al. |
| 2019/0001560 A1 | 1/2019 | Walrand |
| 2020/0247059 A1 * | 8/2020 | Frohnmaier ............ B22F 10/20 |

FOREIGN PATENT DOCUMENTS

| | | |
|---|---|---|
| JP | 2012-246541 A | 12/2012 |
| WO | 93/08928 A1 | 5/1993 |
| WO | 2005097476 A2 | 10/2005 |
| WO | WO-2005-097476 A2 * | 10/2005 |
| WO | 2014/138192 A1 | 9/2014 |

OTHER PUBLICATIONS

Written Opinion dated Jun. 29, 2017, issued in PCT/EP2016/082038 (in French).

* cited by examiner

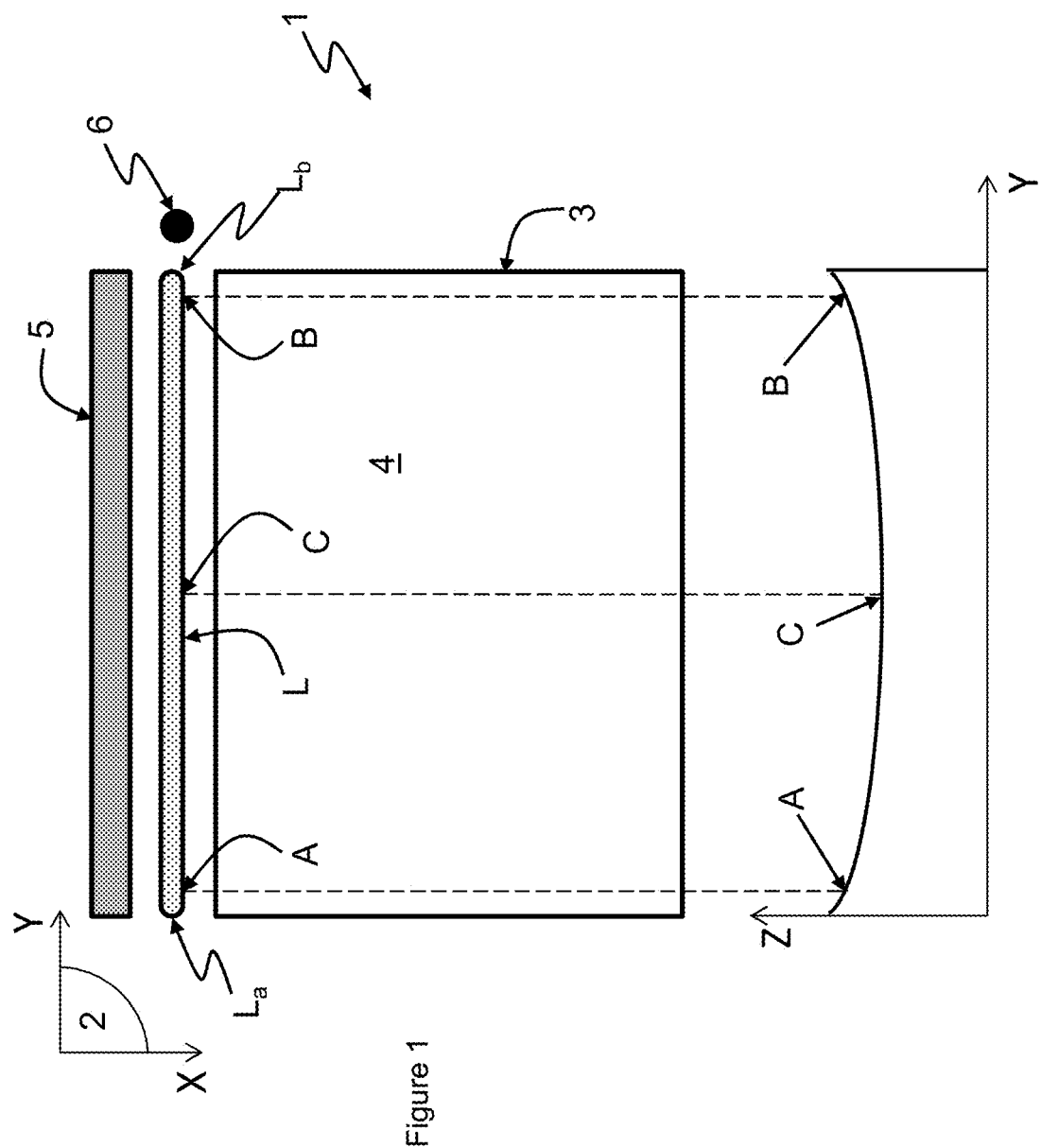

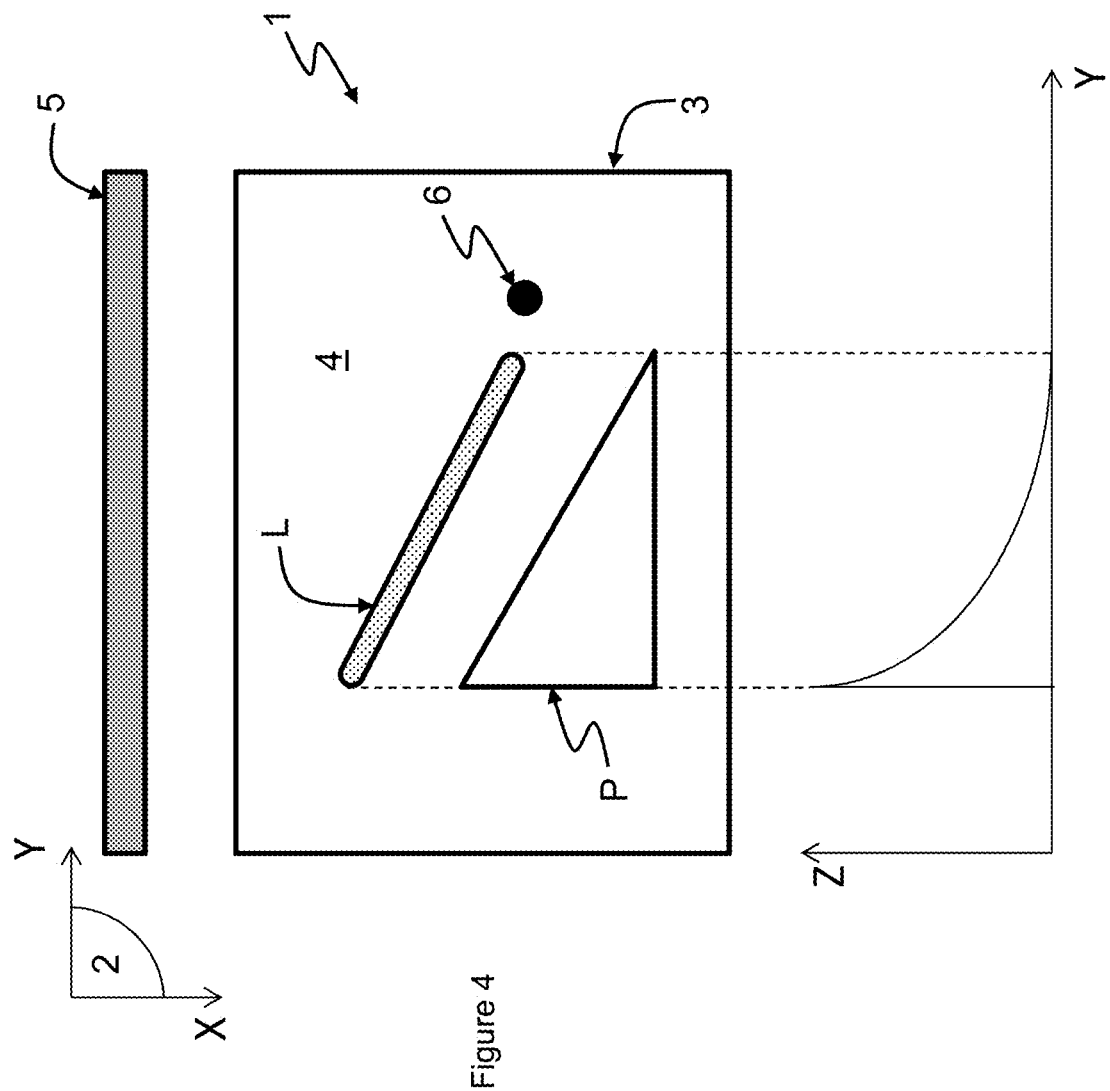

ADDITIVE MANUFACTURING PROCESS COMPRISING A POWDER DISTRIBUTION STEP PERFORMED BY AN INJECTOR

BACKGROUND

The invention relates to the the field of additive manufacturing machines, also known as 3D printers. More specifically, the invention relates to the injection and the dispensing of powder in such a machine.

According to a known technique, a part is produced by "3D" printing starting from a powder. The part is cut up beforehand into slices using a CAO tool. The powder is subsequently spread in successive layers over a working surface, each layer undergoing, before being covered with the following layer, a stage of melting and solidification. To this end, a contribution of energy, for example by a laser beam, makes it possible to form, in the powder layer, a solid corresponding to the slice of the part to be manufactured. The part to be manufactured is generally supported by a plate which moves in a manufacturing chamber as the slices of the part are melted and solidified, in order to be able to form the following powder layer. The plate thus defines a target surface, that is to say a surface, all the points of which can be reached by the laser beam, or any other contribution of energy.

The powder is generally made available on the working surface according to a line, a spreading device, which is typically a roll or a scraper, moving transversely to the powder line and thus providing for the spreading of the powder.

The document U.S. Pat. No. 5,597,589 describes an example of the implementation of the above technique. More specifically, according to this example, a manufacturing machine comprises a powder dispenser, in the case in point made of metal, making it possible to dispense a powder portion. A roll makes it possible optionally to spread the powder. A laser beam will selectively sinter a first layer corresponding to a first slice of the part to be manufactured. The process is subsequently repeated layer after layer.

The powder has to be dispensed over the working surface in front of the spreading device. For example, the powder is in a tank from which the spreading device recovers powder in front of it, on moving, the level of the tank being raised by a piston system as the tank empties, as is presented, for example, in the document WO 93/08928. It is also known to deposit a powder line in front of the spreading device, for example by means of a pouring arm, the length of which corresponds substantially to the length of the spreading device, as in the abovementioned document U.S. Pat. No. 5,597,589.

One problem which is posed is the management of the powder.

This is because, for a part to be manufactured, it is customary to use an amount of powder which is greater than the amount which will, in the end, be melted and solidified in order to constitute the part. In particular, this excess of powder makes it possible to make sure that the powder layer appropriately covers the target surface. More specifically, the powder layers are generally spread starting from a region of the working surface which is fixed, for example starting from the powder tank or starting from a region above which the pouring arm is found. In addition, the dimensions of this region are not adjustable but determined by the length of the spreading device or of the pouring arm. In the end, whatever the dimensions and the geometry of the part to be manufactured, the whole of the manufacturing chamber is filled with the unmelted powder surrounding the part. In addition, it is common practice to provide excess powder overflowing beyond the target surface for each layer, in particular in order to make sure that the whole of the target surface is indeed covered with the powder layer.

Consequently, the amount of powder immobilized in order to manufacture a part is often much greater than the amount of powder which will in the end be melted. This immobilization increases the costs of manufacture of the part.

The document WO 2005/097476 provides for the filling of a trough moving along two rails, and for the filling of the trough over a length between the two rails which is appropriate to the dimensions of the part to be manufactured.

However, this solution is limited since it does not make it possible to be adjusted to the geometry of the part but solely to its dimensions. In addition, in this document, the walls of the manufacturing chamber are constructed with the part to be manufactured, using powder which is not necessary for the manufacture of the part itself.

Furthermore, the powder circuit in this solution involves a large number of subassemblies, which may present a problem, in particular in the field of the manufacture of parts for the aeronautical industry, in which the monitoring of the powder batches used is an important parameter. This is because it is necessary to be capable of identifying, for each part manufactured, the powder batch used. Consequently, when the powder batch used in the machine is changed, it is necessary to make sure that all the powder of the preceding batch which remains in the machine, both in the supply circuit of the machine and on the surfaces inside the machine exposed to the powder, is removed before using the new batch.

In point of fact, in the document WO 2005/097476, the powder passes from a tank to an injector, from the injector to the trough and finally from the trough to the working surface. Consequently, when the powder batch has to be changed, it is necessary to make sure that all these elements are devoid of powder before using a fresh powder batch, which can prove to be tedious.

SUMMARY

There thus exists a need to control the amount of powder dispensed over the working surface which overcomes in particular the abovementioned disadvantages.

To this end, a first subject-matter of the invention is the provision of an additive manufacturing process which makes it possible to limit the amount of excess powder dispensed over the working surface.

A second subject-matter of the invention is the provision of an additive manufacturing process which makes it possible to reduce the manufacturing time.

A third subject-matter of the invention is the provision of an additive manufacturing process which facilitates the change in batches of powder which is used.

A fourth subject-matter of the invention is the provision of an additive manufacturing process which makes it possible to meter the amount of powder dispensed with increased accuracy.

A fifth subject-matter of the invention is the provision of an additive manufacturing process which decreases the time for cleaning the machine.

A sixth subject-matter of the invention is the provision of an additive manufacturing process which decreases the amount of powder contaminated by dross and which thus decreases the cost of recycling the said powder.

According to a first aspect, the invention provides a process for the additive manufacture of a part by partial or complete selective melting of a powder within a machine. The machine comprises in particular:

a working surface intended to receive a powder layer, a device for spreading the said powder layer along at least one longitudinal horizontal direction over the working surface, at least one injector for directly injecting powder over the working surface, the injector being movable with respect to the working surface along at least one transverse horizontal direction, a system for regulating the amount of powder dispensed by the injector.

The process then comprises in particular the following stages:

moving the injector along a trajectory comprising at least one component parallel to the transverse horizontal direction;

regulating the amount of powder dispensed by the injector at any point of the trajectory of the injector.

The process thus ensures control over the amount of powder dispensed over the working surface in order to adjust it according to requirements.

According to one embodiment, the injector is movable with respect to the working surface along the longitudinal direction, so as to also make possible the regulation of the amount of powder dispensed over the working surface during the movement of the injector along the longitudinal direction. The amount of powder dispensed can thus even more be adjusted to requirements. To this end, for example, the injector is integrally attached along the longitudinal direction to the spreading device, so that it is not necessary to install an additional mechanism for moving the injector longitudinally than that managing the movement of the spreading device.

According to one embodiment, the injector is mounted in removable fashion in the machine, so that it can be withdrawn from the machine in order to be cleaned, for example between two powder batches, providing optimum monitoring of the powder batches.

According to one embodiment, the injector is movable with respect to the working surface along a vertical direction, the regulating system regulating the vertical position of the injector with respect to the working surface. Thus, the amount of powder dispensed can be regulated by regulating the height of the injector with respect to the working surface.

The stage consisting in regulating the amount of powder dispensed by the injector at any point of the trajectory of the injector can be carried out as a function of the following parameters, considered alone or in combination:

as a function of the geometry of the part to be manufactured, as a function of the dimensions of the part to be manufactured, as a function of the position of the part to be manufactured on the working surface, as a function of the material of the region of the part to be manufactured on the working surface.

According to a second aspect, the invention provides a machine for the additive manufacture of a part by partial or complete selective melting of a powder comprising:

a working surface intended to receive a powder layer, a device for spreading the said powder layer along at least one longitudinal horizontal direction over the working surface, at least one injector for directly injecting powder over the working surface, the injector being movable with respect to the working surface along at least one transverse horizontal direction, a system for regulating the amount of powder dispensed by the injector, the machine being particularly suitable for carrying out the process as presented above.

BRIEF DESCRIPTION OF THE DRAWINGS

Other characteristics and advantages of the invention will become apparent in the light of the description of exemplary embodiments of the invention, accompanied by the figures, in which:

FIG. 1 is a diagrammatic representation in top view of a working surface in an additive manufacturing machine comprising a point injector in which the additive manufacturing process is carried out according to a first exemplary embodiment;

FIG. 2 is a graph illustrating the powder deposition profile of FIG. 1;

FIG. 4 is a diagrammatic representation similar to FIG. 1, for a third exemplary embodiment of the additive manufacturing process;

FIG. 5 is a graph illustrating the powder deposition profile of FIG. 4;

DETAILED DESCRIPTION

Figure 3:
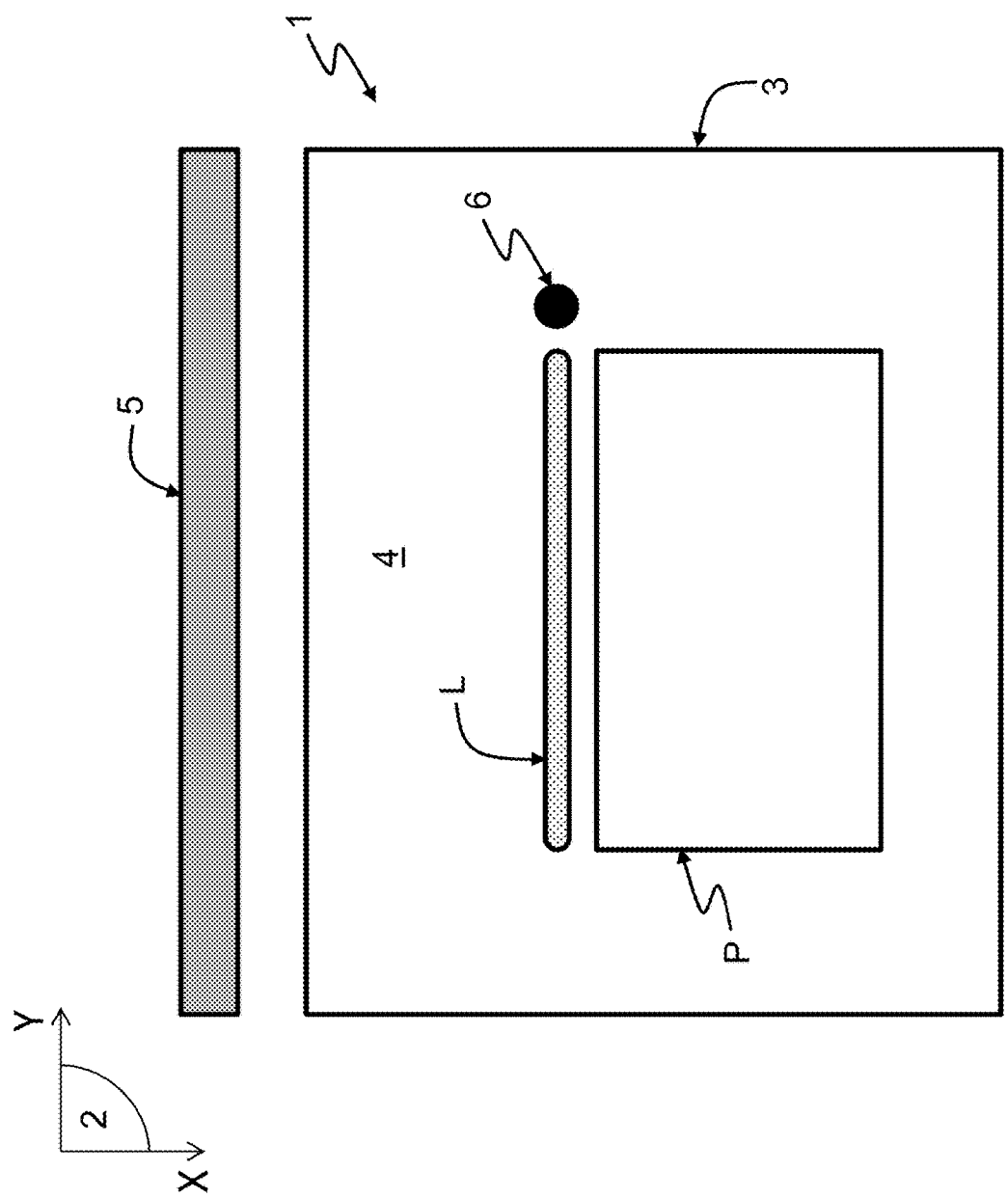
FIG. 3 is a diagrammatic representation similar to FIG. 1, for a second exemplary embodiment of the additive manufacturing process.

A machine for the additive manufacture of a part, by complete or partial melting of a powdered material, is represented diagrammatically in FIGS. 1 to 9. The material used can, for example, be metallic or plastic.

The machine 1 typically comprises a chamber, with the atmosphere preferably inert with regard to the material used, the bottom of which corresponds to a working surface 2 considered here as horizontal.

For the purposes of clarity and simplicity, there are defined, on the working surface 2, a longitudinal axis X and a transverse axis Y, which are parallel to the working surface 2 and orthogonal to one another. The adjective "longitudinal" and its alternative forms then denote, in that which follows, any direction parallel to the longitudinal axis X; likewise, the adjective "transverse" and its alternative forms denote any direction parallel to the transverse axis Y.

The machine 1 comprises a casing 3, extending under the working surface 2 along a vertical axis, and opened into the chamber. The casing 3 is generally used for guidance with a part support plate, not represented, on which the part P in the course of manufacture rests. The plate descends vertically into the casing 3 as the slices of parts are formed by melting and solidification of the powder of the corresponding layers. The casing 3 thus surrounds a target surface 4, corresponding to the surface of the plate seen from the inside of the chamber in a horizontal plane, each point of which is capable of being reached, for example, by a laser beam in order to melt the powder. Thus, for the first powder layer, the target surface corresponds to the upper surface of the part support plate. For the following layers, the target surface 4 corresponds to the surface of melted and solidified and unmelted and solidified powder of the preceding layer, delimited by the edges of the part support plate.

The machine 1 furthermore comprises a melting system, not represented, which makes it possible for the powder to melt and then to solidify. It is, for example, a laser sending a beam to the target surface 4 in order to at least partially melt the powder.

The machine 1 additionally comprises a device 5 for spreading a powder layer, mounted in movable fashion in the chamber with respect to the working surface 2 along the longitudinal axis X. In the examples presented here, the spreading device 5 is a roll with an axis of rotation parallel to the transverse axis Y. However, the spreading device 5 can be of any type, for example a scraper.

The machine 1 additionally comprises an injector 6, connected to a powder tank. Injector denotes here a point injector, that is to say the dimension of which is much less than that of the target surface 4, the amount of powder delivered by the point injector 6 at a given instant being similar to a point, with respect to the target surface 4. The injector 6 is directly facing the working surface 2, that is to say that the powder exiting from the injector 6 is dispensed directly over the working surface 2.

The point injector 6 is mounted in movable fashion in the chamber, at least along the transverse axis Y, with respect to the working surface 2, that is to say that its trajectory comprises at least one transverse component. The movement of the injector 6 can be continuous or discontinuous.

Finally, the machine comprises a system for regulating the amount of powder injected by the injector 6. Regulating the amount of powder is understood here to mean that a control is exerted over the injector 6. For example, the regulating system makes it possible to control and adjust at any instant the powder throughput of the injector 6, optionally as a function of its rate of movement. The powder injection method can be continuous or discontinuous.

According to one example, the injector 6 is movable in translation along a vertical axis Z. The regulating system then makes it possible to regulate the height of the injector 6, that is to say the distance between the powder outlet of the injector 6 and the working surface 2, in order to regulate the amount of powder dispensed over the working surface 2. In this exemplary embodiment of the invention, the powder falls from the injector substantially by gravity. The powder dispensed over the working surface takes the form of a slope. When the powder slope reaches the injector and blocks the outlet orifice of the injector through which the powder flows, there is no longer flow of powder. Furthermore, when the outlet orifice of the injector through which the powder flows is in contact with the working surface 2, there is no flow of powder. Thus, the variation in the height of the injector 6 makes it possible to vary the throughput at the outlet of the injector.

It is then possible to determine a trajectory of the injector 6 along a transverse direction along which powder has to be dispensed, and to control the amount of powder dispensed at any point of this trajectory so as to dispense the required amount of powder over the working surface at the place where this is necessary, according to requirements. Each point of the trajectory of the injector 6 is, for example, but not necessarily, substantially coincident with the centre of the outlet of the injector 6. For example, when a part slice to be manufactured exhibits a smaller transverse dimension than the transverse dimension of the target surface 4, then the trajectory of the injector 6 along which the powder is dispensed can be adjusted to the transverse dimension of the slice of the part P to be manufactured.

The amount of powder dispensed along the trajectory of the injector 6 can also be adjusted so as to make sure that the powder layer appropriately covers the part slice to be manufactured. This is because it may be that the powder is ejected by the spreading device 5 on either side transversely, so that the longitudinal edges of the layer are not rectilinear. Reference is then made to tongue effect. In order to overcome it, the injector 6 can dispense an amount of powder at the transverse ends of the trajectory of the injector 6 which is greater than the amount of powder dispensed otherwise.

Finally, the amount of powder dispensed along the trajectory of the injector 6 can also be adjusted in order to compensate for the decrease in volume of the molten and solidified powder. This is because, when a part slice is formed by melting and solidification of the powder, the density of the melted and solidified slice is greater than the density of the unmelted powder, the melted and solidified slice forming a subsidence in the powder layer. Consequently, when the following layer covering the slice in question has to be spread, in order to obtain a flat layer, this subsidence has to be taken into account. The injector 6 can then dispense, along its transverse trajectory, a greater amount of powder accurately at the subsidence in order to compensate for it, without having to increase the amount of powder over the whole of its trajectory.

A first exemplary embodiment of the manufacturing process is illustrated in FIG. 1. According to this first exemplary embodiment, a powder layer has to be formed in order to cover the whole of the target surface 4. The injector 6 is moved, starting from a resting position, transversely with respect to the working surface 2, in order to dispense powder along at least one transverse line L, over a transverse distance corresponding to the transverse dimension of the target surface 4. The line L of powder exhibits a longitudinal dimension which can be adjusted. This longitudinal dimension depends in particular on the dimension of the outlet of the injector 6.

In the example of FIG. 1, the to movement of the injector 6, during which the powder is dispensed, is carried out from left to right, and the amount of powder dispensed by the injector 6 along the transverse direction is regulated so that it is greater close to the ends La and Lb of the line L, in order to compensate for the tongue effect. More specifically, the height of powder of the line L of dispensed powder can vary according to the transverse position on the line L of powder. The profile of the height of powder dispensed along one and the same transverse direction is then, for example, in the form of a parabola, as illustrated in FIG. 2. In other words, the amount of powder dispensed respectively at the points A and B, close respectively to the ends $L_a$ and $L_b$ of the line L of powder, is greater than the amount of powder dispensed at the point C located substantially at the middle of the line L of powder, the three points A, B and C being substantially aligned transversely.

The injector 6 can subsequently be brought back to its resting position in a fro movement, on the left of the working surface 2 according to the example of FIG. 1, in order to dispense a new line of powder for the following layer in a new to movement, or dispense the new line of powder during the fro movement starting from the final position reached during the formation of the preceding line, on the right of the working surface 2 according to the example of FIG. 1.

A second exemplary embodiment is illustrated in FIG. 3, in which the injector 6 is movable along the longitudinal axis X in addition to being movable transversely. According to this second exemplary embodiment, the shape of the part P to be manufactured is such that the powder layer to be formed does not necessarily have to completely cover the target surface 4. Consequently, the point injector 6 has been moved longitudinally beforehand without dispensing powder and has then been moved transversely so as to dispense powder along a line L, the transverse dimension of which is adjusted to that of the slice of the part P to be manufactured. Thus, not all the target surface 4 is covered with powder, and the amount of powder dispensed in excess can be decreased. The profile of the height of powder dispensed along the transverse direction of the line L of powder can be of parabolic shape, as in the first exemplary embodiment, in order to limit the tongue effect.

The point injector 6 moving along the longitudinal axis X and along the transverse axis Y thus makes it possible to dispense the powder while optimizing the dimensions of the successive powder layers, with respect to the dimensions of the part to be manufactured, in order to limit the use of powder in excess, and also as a function of the position of the part P to be manufactured on the target surface 4, without having to fill the target surface 4. More specifically, the amount of powder dispensed over the working surface 2 as a function of the transverse direction is produced as a function of the dimensions and of the position on the target surface 4 of each slice of the part P to be manufactured. In particular, when the slice under consideration of the part P to be manufactured has smaller dimensions than the dimensions of the target surface 4, that is to say of the part support plate, it can be advantageous not to cover the target surface 4 but to form the powder layer in localized fashion on the target surface 4.

A third exemplary embodiment of the process is illustrated in FIGS. 4 and 5, in which the injector 6 is movable both transversely and longitudinally. According to this third exemplary embodiment, the geometry of the slice of part P to be manufactured exhibits an edge which is inclined with respect to the transverse and longitudinal directions. The transverse dimension of the slice is furthermore less than the transverse dimension of the target surface 4. The trajectory of the injector 6 is then consequently adjusted, so as to dispense a line L of powder exhibiting a transverse component and a longitudinal component, approaching the inclined edge, the transverse dimension of which corresponds substantially to that of the slice of the part P to be manufactured. In addition, according to the example of FIGS. 4 and 5, the amount of powder necessary for the slice in question decreases transversely, in the case in point from the left towards the right. The amount of powder dispensed by the injector 6 moving along the line L is then consequently regulated so that the profile of the height of powder dispensed along the transverse direction is decreasing from the left towards the right.

Thus, the amount of powder dispensed is adjusted as a function of the geometry of the part P to be manufactured and more specifically as a function of the geometry of the slice under consideration of the part P to be manufactured. In other words, the volume of powder dispensed over the working surface 2 is adjusted to the volume of powder required for the slice under consideration.

Figure 6:
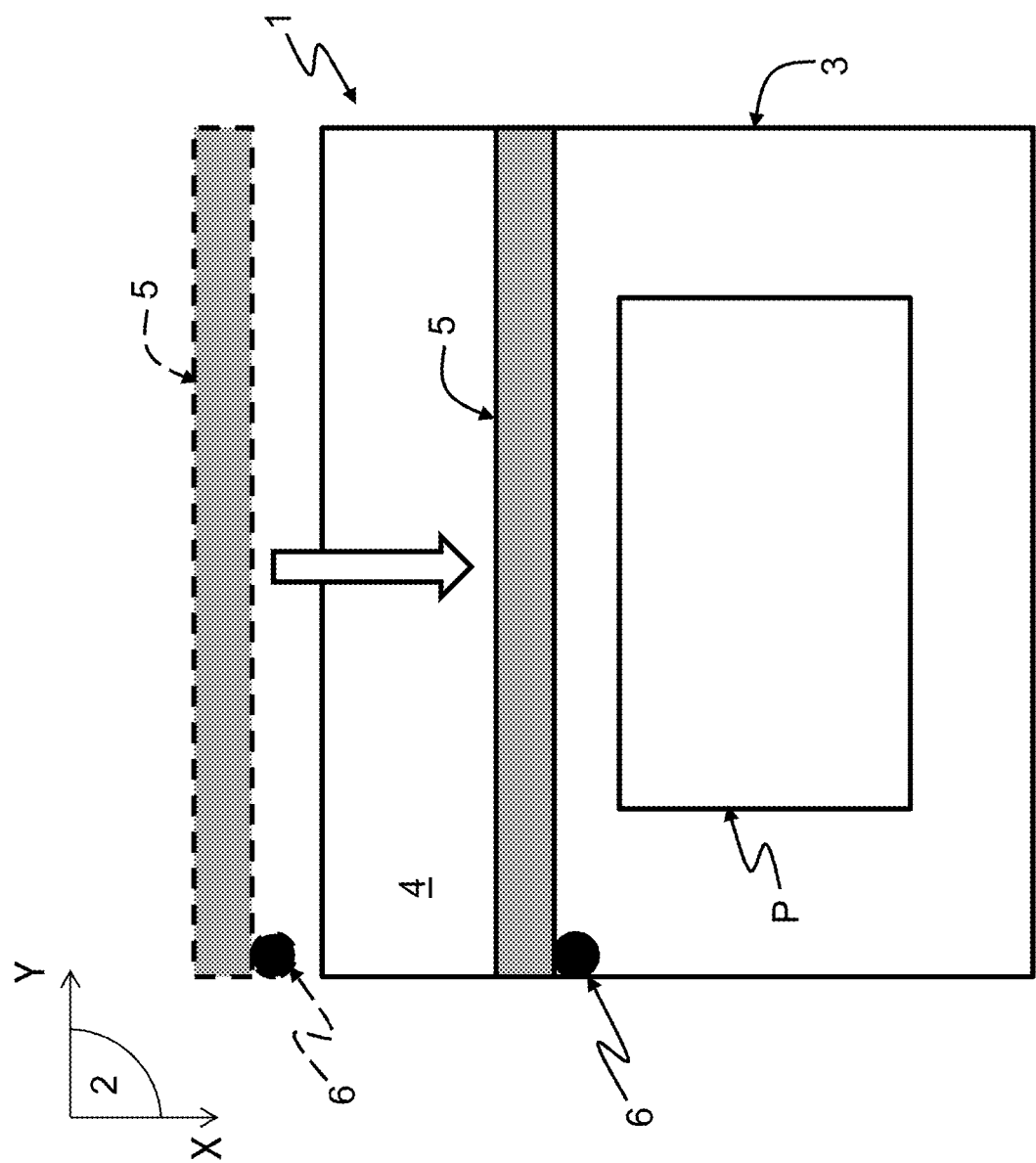
FIGS. 6 and 7 are diagrammatic representations similar to FIG. 1, for a fourth exemplary embodiment of the additive manufacturing process.
Figure 7:
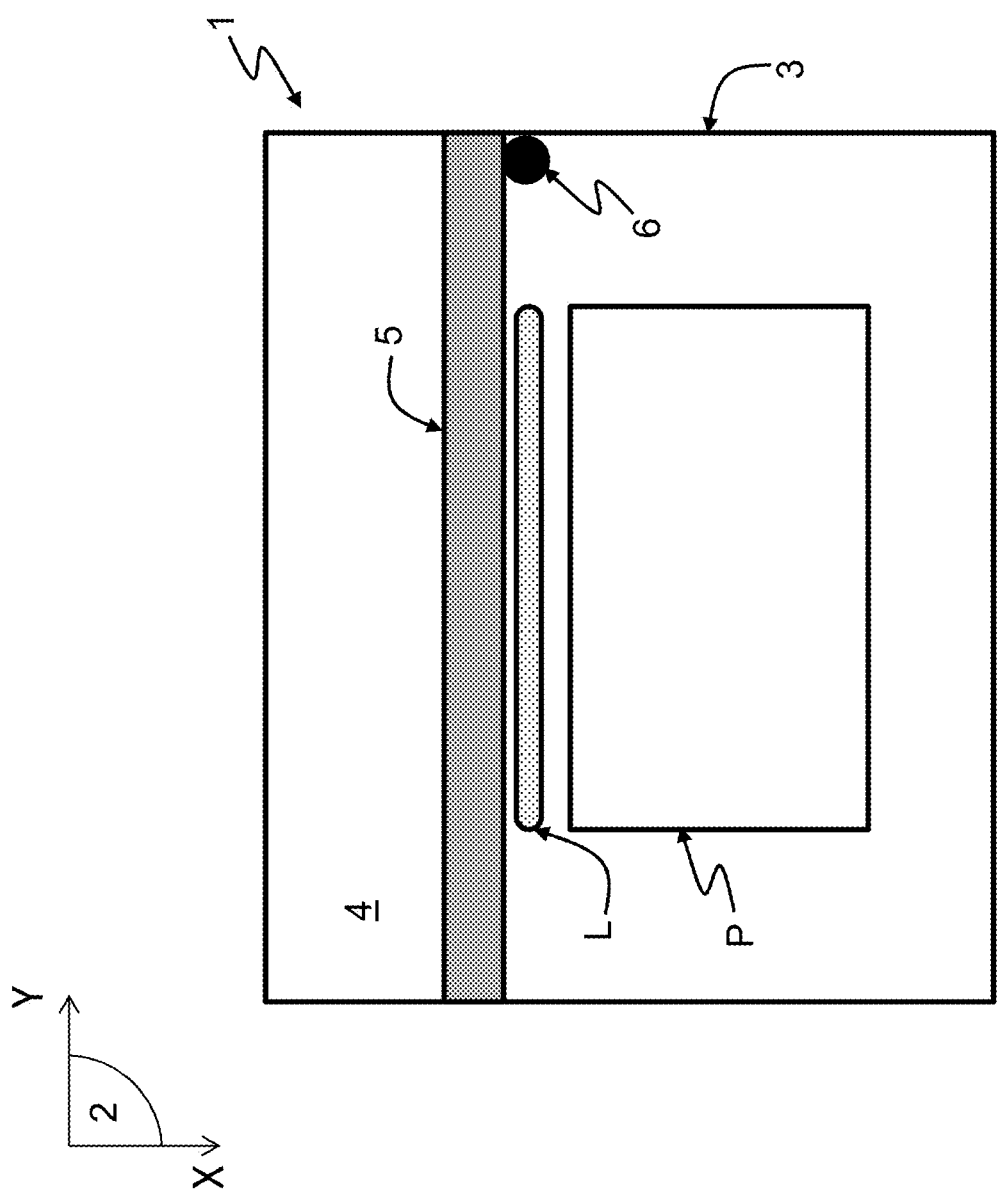

A fourth exemplary embodiment of the manufacturing process is illustrated in FIGS. 6 and 7. In this fourth example, the point injector 6 is integrally attached in movement along the longitudinal axis X to the spreading device 5 and is movable with respect to the spreading device 5 along the transverse axis Y. For example, the point injector 6 can be mounted on a slide rail along the transverse axis Y which is rigidly fixed to the spreading device 5. The shape of the part P to be manufactured according to this fourth exemplary embodiment is similar to that of the second exemplary embodiment, so that the layer to be formed does not completely cover the target surface 4. By virtue of the spraying device 5 and the injector 6 being integrally attached, in a single control of movement along the longitudinal axis X, the spreading device 5 and the point injector 6 are moved at the same time from an initial position, represented in broken lines in FIG. 6, into a position as close as possible to the layer to be formed, represented in solid lines in FIG. 6. The point injector 6 is subsequently moved along the transverse axis Y, along the spreading device 5, so as to dispense, as in the second exemplary embodiment, a line L of powder, the transverse dimension of which is adjusted as a function of the transverse dimension of the slice of the part P to be manufactured. The amount of powder along the line L of powder is also adjusted, for example as in the second exemplary embodiment, in order to compensate for the tongue effect during the spreading.

When the injector 6 is integrally attached in longitudinal movement to the spreading device 5, the transverse movement of the powder injector 6 and the injection of powder can take place at the same time as the spreading device 5 is moved longitudinally, for example in order to fit a specific geometry, as in the third exemplary embodiment.

Figure 8:
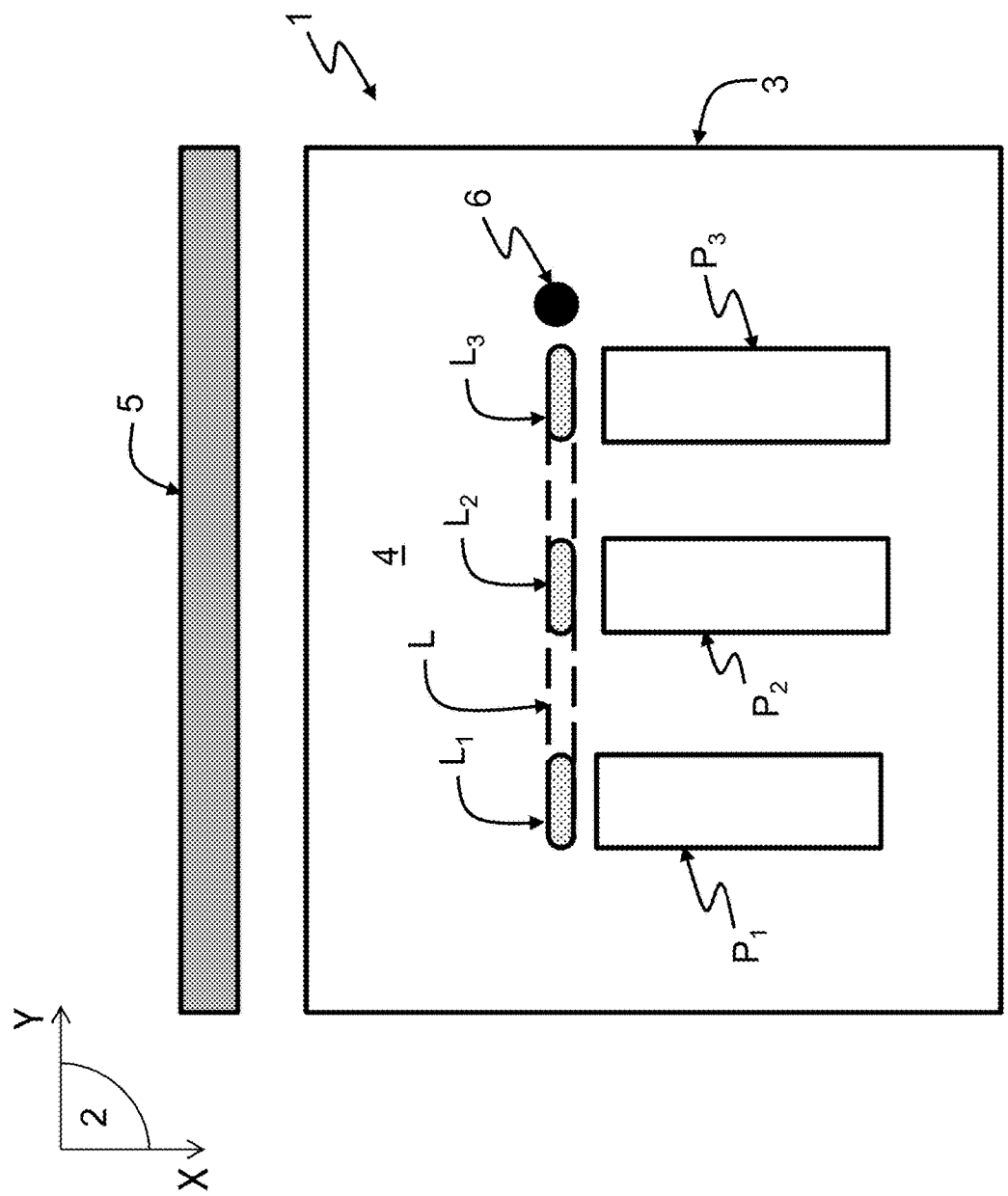
FIG. 8 is a diagrammatic representation similar to FIG. 1, for a fifth exemplary embodiment of the additive manufacturing process.
Figure 9:
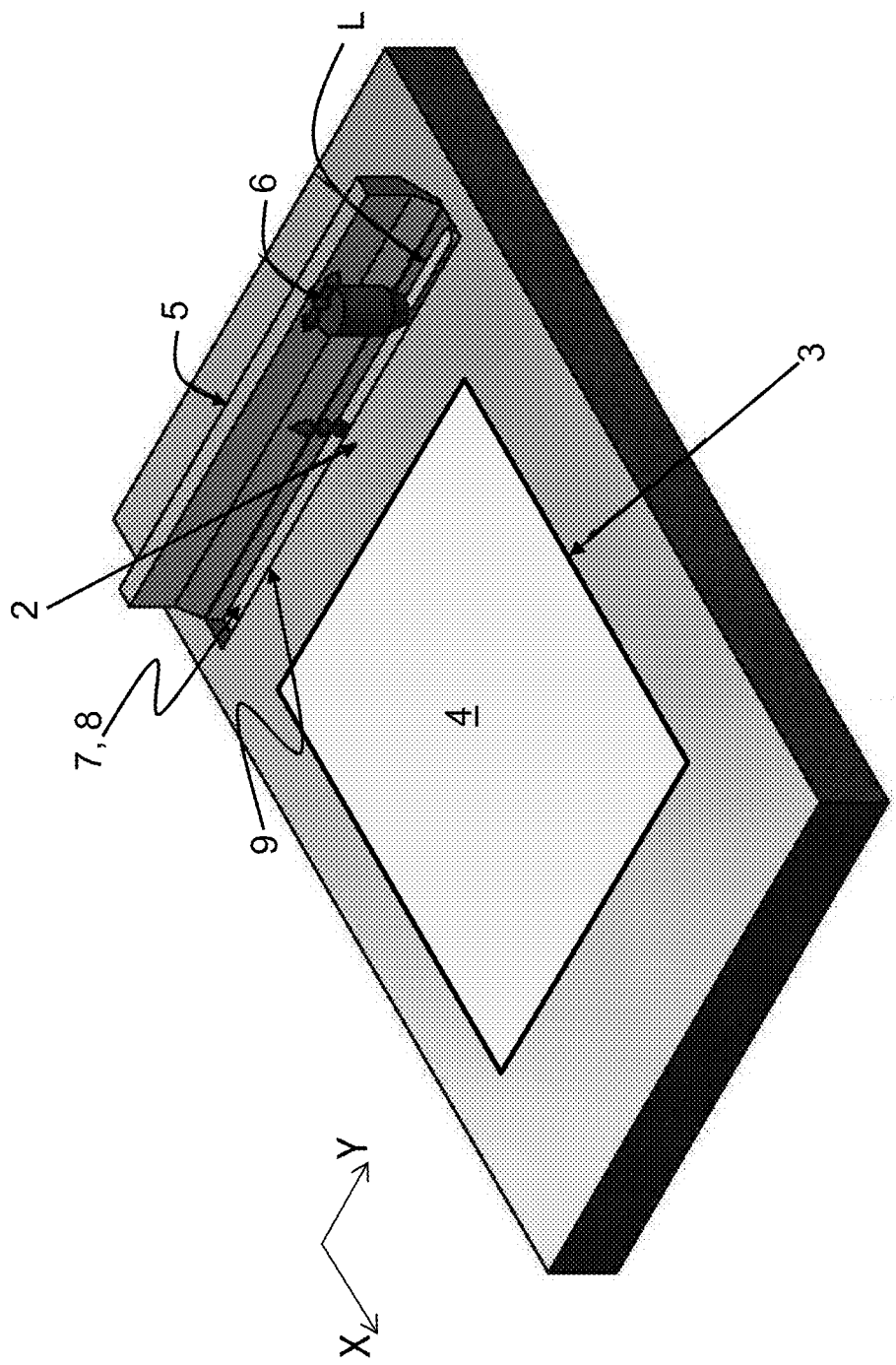
FIG. 9 is a diagrammatic representation of a portion of the working surface according to an alternative embodiment of the additive manufacturing machine.

In FIG. 8, a fifth exemplary embodiment of the manufacturing process is illustrated, in which the slice of part P to be manufactured comprises three disconnected portions $P_1$, $P_2$ and $P_3$. In this case, the regulating system regulates the amount of powder dispensed by the injector 6 in order to form a discontinuous line L on the working surface 2, that is to say that the line L of powder comprise three sections $L_1$, $L_2$ and $L_3$ respectively which are disconnected and which correspond, in transverse dimension and in position, to the portions $P_1$, $P_2$ and $P_3$ respectively of the slice. In other words, there exist points of the trajectory of the injector 6 for which the amount of powder dispensed is zero.

These examples are not limiting. It is understood that, by virtue of the movement of the injector at least along the transverse axis Y and of the control of the amount of powder during this movement, it is possible at any point of the trajectory of the injector 6 to have an amount of powder adjusted to requirements. Thus, at a point of the trajectory of the injector 6, there may not be powder dispensed at all, or an amount which is a function in particular of the geometry and/or of the shape of the slice under consideration of the part P to be manufactured and/or of the position of the slice under consideration of the part P to be manufactured and/or of the tongue effect and/or of the subsidence effect. The trajectory of the injector 6 can be rectilinear or curved.

The amount of powder dispensed at any point can be determined, for example, by weight or by volume. As in the exemplary embodiments described here, the amount of powder dispensed at any point of the trajectory of the injector 6 is determined by the height of powder. The injector 6 can then also be movable with respect to the work plane 2 along the vertical axis Z, for example in order to be moved along Z in order to follow the height of powder dispensed.

The injector 6 can also be employed to dispense several materials. For example, the injector 6 can prepare a first line of powder of a first material and a second line of powder of a second material, the two lines being separated from one another longitudinally and/or transversely.

Although, in the exemplary embodiments presented below, the machine 1 comprises just one point injector 6, it can be otherwise for them. For example, the machine 1 can comprise two point injectors 6, which are movable with respect to the working surface 2, each providing for the dispensing of powder over the target surface 4 and making it possible, for example, to use identical or different powders. A second spreading device 5 can then advantageously be used with the second point injector 6. The use of an injector 6 dedicated to each type of material exhibits the advantage of facilitating the cleaning and the monitoring of the powder batches. Thus, generally, the machine 1 can comprise as many injectors 6 as types of material which it is envisaged to use to manufacture the part P.

Advantageously, the machine 1 can additionally comprise a mechanism for cleaning the working surface 2, so as to make sure that the injector 6 dispenses a line of the powder over the working surface 2 without powder from the preceding layer remaining and thus so as to make sure that the height of powder dispensed over the working surface 2 by the injector 6 is known with precision. The cleaning mechanism is provided, for example, in the form of a scraper which is movable with respect to the working surface 2, making it possible to push the powder outside the working surface 2. The scraper can advantageously be fixed to the injector 6, so that, once the injector 6 has dispensed a line of powder over the working surface 2 in a to movement, the fro movement of the injector 6, without dispensing powder, makes it possible to discharge the excess powder on its passage. The scraper can be unidirectional, that is to say that it pushes the powder solely for one and the same direction of movement. In order to increase the productivity of the machine, it can be advantageous not to bring the injector back into one and the same initial position in order to start each line of powder. In this case, a retractable scraper is positioned on each side of the injector 6 along its direction of movement. The scraper positioned in front of the injector along its direction of movement discharges the remaining powder on the working surface 2 before the injector 6 dispenses the powder, while the scraper positioned on the other side is raised in order not to touch the powder which the injector has just dispensed. The scraper furthermore makes it possible to scrape off the dross, that is to say the agglomerated pieces of powder which do not form a portion of the part P to be manufactured. The powder discharged by the scraper can then be taken away to a predetermined point of the working surface 2, where it is discharged via a dedicated orifice.

In combination with the mechanism for cleaning the surface or as replacement, the machine 1 can comprise a system for verifying the amount of remaining powder on the working surface 2, before dispensing a new line L of powder for the following layer. The verification system can comprise, for example, a sensor of height of remaining powder at any point of the working surface 2. The regulating device can thus adjust the dispensing of powder by the injector 6 over the working surface 2 as a function of the remaining amount in order to reach the predetermined amount, this being the case at any point of the trajectory of the injector 6. In an alternative form, the machine can comprise a system for verifying the amount of powder deposited on the receiving surface 11 which makes it possible to control, in a closed loop, the throughput of powder delivered by the injector.

According to an alternative embodiment in which the injector 6 is fixed along the longitudinal direction (FIG. 9), the line L of powder, for each layer, is localized, with respect to the working surface 2, on a predetermined "receiving" surface 7. The receiving surface 7 is movable with respect to the working surface 2 along a vertical direction, so as to regulate the amount of powder with increased accuracy. For example, the movable receiving surface 7 is formed by an upper surface of a slide 8 which is moved vertically in a transverse groove 9 with respect to the working surface 2. The dimension of the slide 8 is adjusted in order to make possible vertical sliding in the groove 9, with a just sufficient play, and the outlet of the injector 6 is in contact with the working surface 2, so as to deposit powder solely in the groove 9, on the receiving surface 7. More specifically, starting from a position in which the slide 8 is in a bottom position, close to the bottom of the groove 9, the injector 6 is displaced transversely with respect to the working surface 2 in order to dispense powder over the receiving surface 7. As the longitudinal dimension of the groove 9 is known, by adjusting the height of the injector 6 with respect to the receiving surface 7 during the transverse movement of the injector 6, the volume of powder dispensed into the groove is known with accuracy. Once the injector 6 has completed its movement, the receiving surface 7 is moved vertically by a controlled and known height in order to be spread by the spreading device 5. Thus, along a transverse direction, the height of powder emerging out of the groove 9 is controlled and known. The powder dispensed over the receiving surface 7 may be completely emerged, over its entire height, out of the groove 9, the receiving surface 7 being flush with the working surface 2. However, a portion only of the power dispensed over the receiving surface 7 may be emerged out of the groove 7.

According to an advantageous exemplary embodiment, the base of the injector 6 has a shape which makes it possible to cover the width of the groove 9 and the powder falls from the injector 6 substantially by gravity. The injector 6 is held in the immediate vicinity of the working surface 2 during the injection of powder into the slide 8 so that powder cannot slip between the working surface and the injector. Thus, when the powder fills the volume of the slide placed under the injector, it blocks the entire opening of the injector 6 through which the powder flows, and there is no longer flow of powder. By controlling the vertical position of the slide 8 during the movement of the injector 6 along the transverse direction, it is thus possible to obtain great accuracy with regard to the amount of powder dispensed.

The groove 9 optionally makes it possible to recover the excess powder.

For example, the spreading device 5 having spread a layer of powder at least in part over the target surface 4 in a to movement and the part slice having been melted and solidified, the spreading device 5 can be equipped in order to collect the excess powder in a fro movement. The slide 8 having been lowered towards the bottom of the groove 9, the powder can fall onto the receiving surface 7 or onto the bottom of the groove 9. The machine 1 can then comprise a recovery system which makes it possible to discharge the powder out of the groove 9.

Provision may also be made to place two grooves on either side, in the longitudinal direction, of the target surface 4, in each of which a slide 8 is movable vertically. Thus, the spreading device 5 can, in one and the same movement, spread a layer of powder over the target surface 4 and cause the excess powder to fall into a groove. Then, in the opposite movement, dispense a new layer of powder and cause the excess layer from this new layer to fall into the other groove.

In another alternative form, the machine 1 can comprise one or two grooves, which make it possible to recover the excess powder, which are not associated with a slide.

Thus, by using the point injector 6 which is movable with respect to the working surface 2, the amount of powder required can be adjusted to the best, taking into account different parameters, such as the tongue effect, the geometry of the part, its dimensions and its position on the target surface 4. The excess powder with respect to the part P to be manufactured is thus reduced.

By localizing, at least transversely, the powder dispensed over the working surface 2, the operations of cleaning the machine 1 are limited. This is because, in particular in the case where the dimensions of the part P to be manufactured are less than the dimensions of the part support plate, that is to say of the target surface 4, the powder can be dispensed solely over the target surface 4, even taking into account the compensation for the tongue effect during the spreading. Thus, all the powder is localized on the support plate, in the casing 3, so that the cleaning from the powder, in particular on the occasion of the change in powder batches, is reduced to the casing.

According to one embodiment, the injector 6 can be directly connected to a powder tank. The circuit for feeding with powder then comprises, for example, the tank, the injector and a flexible pipe connecting the tank to the injector 6. Optionally, a hopper making it possible to meter the powder can be interposed in the circuit between the tank and the injector 6. There is no other element interposed between the powder and the working surface 2, the injector 6 injecting the powder directly onto the working surface 2. Consequently, when the powder batch has to be changed, in order to make sure that powder no longer remains in the powder feed circuit, the latter can be removed from the machine, completely cleaned and then placed back in the machine. For example, the injector 6 is mounted in the machine 1 in removable fashion on a support, the support providing for the guiding in transverse movement, and optionally in longitudinal movement and in height, of the injector 6. A system for locking and unlocking the injector on its support is then provided, so as to make it possible to easily remove the injector 6 from the machine 1.

The manufacturing time is also decreased, since the amount of powder to be dispensed is reduced.

As the amount of powder used at each layer is reduced as close as possible to the amount of powder melted, the powder contaminated by the dross during the melting is also decreased. The time and thus the costs for recycling the contaminated powder are found to be reduced thereby.

The invention claimed is:

1. A process for the additive manufacture of a part by partial or complete selective melting of a powder within a machine, the machine comprising: (a) a working surface configured to receive a powder layer, (b) a spreading device for spreading the powder layer along at least one longitudinal horizontal direction over the working surface, (c) at least one injector for directly injecting powder over the working surface, the injector being movable with respect to the working surface along at least one transverse horizontal direction, and (d) a system for regulating an amount of powder dispensed by the injector, the process comprising the following steps:

moving the injector along a trajectory comprising at least one component parallel to the transverse horizontal direction in order to dispense powder along at least one line on the working surface; and regulating the amount of powder dispensed by the injector at any point of the trajectory of the injector such that a height of powder of the line of dispensed powder is greater close to each transverse end of the line than the height of powder located substantially at the transverse middle of the line.

2. The process according to claim 1, wherein the injector is movable with respect to the working surface along the longitudinal direction.

3. The process according to claim 2, wherein the injector is integrally attached, along the longitudinal direction, to the spreading device.

4. The process according to claim 1, wherein the injector is mounted in movable fashion in the machine.

5. The process according to claim 1, wherein the injector is movable with respect to the working surface along a vertical direction, and wherein the regulating system regulates the vertical position of the injector with respect to the working surface.

6. The process according to claim 1, wherein the regulating step is carried out as a function of a geometry of the part to be manufactured.

7. The process according to claim 1, wherein the regulating step is carried out as a function of dimensions of the part to be manufactured.

8. The process according to claim 1, wherein the regulating step is carried out as a function of a position of the part to be manufactured on the working surface.

9. The process according to claim 1, wherein the regulating step is carried out as a function of a material of the region of the part to be manufactured on the working surface.

* * * * *